United States Patent
Goyal et al.

(10) Patent No.: US 10,735,139 B1
(45) Date of Patent: Aug. 4, 2020

(54) RETRANSMISSION IDENTIFICATION IN WIRELESS SYSTEMS

(71) Applicant: QUALCOMM Incorporated, San Diego, CA (US)

(72) Inventors: Giriraj Goyal, Bangalore (IN); Vishal Agarwal, Ramnagar (IN); Nitin Raghavendra Kidiyoor, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/277,481

(22) Filed: Feb. 15, 2019

(51) Int. Cl.
| | |
|---|---|
| *H04L 1/00* | (2006.01) |
| *H04L 5/00* | (2006.01) |
| *H04L 12/801* | (2013.01) |
| *H04L 12/743* | (2013.01) |
| *H04W 56/00* | (2009.01) |
| *H04L 1/16* | (2006.01) |

(52) U.S. Cl.
CPC .......... *H04L 1/0061* (2013.01); *H04L 1/1621* (2013.01); *H04L 5/0055* (2013.01); *H04L 45/7453* (2013.01); *H04L 47/34* (2013.01); *H04W 56/001* (2013.01); *H04L 47/10* (2013.01)

(58) Field of Classification Search
CPC ... H04L 45/7453; H04L 45/745; H04L 47/10; H04L 47/2441; H04L 47/34
See application file for complete search history.

(56) References Cited

U.S. PATENT DOCUMENTS

| | | | |
|---|---|---|---|
| 7,522,516 B1* | 4/2009 | Parker | H04L 12/56 370/216 |
| 7,606,877 B2* | 10/2009 | Lee | H04L 12/14 370/392 |
| 7,957,396 B1* | 6/2011 | Kohn | H04L 47/2441 370/395.32 |
| 9,130,978 B2* | 9/2015 | Wei | H04L 63/1458 |
| 10,230,824 B2* | 3/2019 | Bergeron | H04L 69/22 |
| 10,574,577 B1* | 2/2020 | Matthews | H04L 45/22 |
| 2002/0099900 A1* | 7/2002 | Kawarai | H04L 49/201 710/317 |
| 2007/0165638 A1* | 7/2007 | Hasani | H04L 47/10 370/392 |
| 2007/0169179 A1* | 7/2007 | Narad | H04L 45/16 726/4 |
| 2008/0049774 A1* | 2/2008 | Swenson | H04L 45/7453 370/412 |
| 2011/0107059 A1* | 5/2011 | Oh | G06F 9/5027 712/18 |

* cited by examiner

*Primary Examiner* — Raj Jain
(74) *Attorney, Agent, or Firm* — Holland & Hart LLP/Qualcomm

(57) ABSTRACT

Methods, systems, and devices for wireless communications are described. Generally, the described techniques provide for receiving a first packet comprising a first sequence number (SEQN) and a second packet comprising a second SEQN, and obtaining a first hash for the first packet and a second hash for the second packet. The receiving device may classify the second packet as one of a new packet or a retransmission of the first packet based on a comparison between the first SEQN and the second SEQN and a comparison between the first hash and the second hash. The receiving device may selectively process the payload of the second packet based on the classifying.

20 Claims, 11 Drawing Sheets

RETRANSMISSION IDENTIFICATION IN WIRELESS SYSTEMS

BACKGROUND

The following relates generally to wireless communications, and more specifically to reliable determination of retransmission or new packet in wireless protocols.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, Bluetooth devices may include, for example, a device such as a cell phone, smart phone, portable music player, or the like. Such a device may be in communication with one or more speakers (e.g., true wireless stereo (TWS) Bluetooth ear buds). A speaker, such as an ear bud (e.g., a primary ear bud), may be connected to the phone and may pass the information (e.g., timing information) of the piconet where the phone is the master device to the second ear bud (e.g., a secondary bud or sniffer bud). The secondary ear bud may sniff voice data between the primary ear bud and the phone.

In some examples of wireless communications protocols, a primary ear bud and secondary ear bud may determine whether a received packet is a retransmission of a previously received packet, or a new packet. Each packet may include a sequence number (SEQN) indicating where the received packet falls in a string of sequences. One or both of the receiving devices may determine whether a received packet is a new packet or a retransmission. If the receiving device makes this determination in error, then the user experience may be significantly degraded.

SUMMARY

The described techniques relate to improved methods, systems, devices, and apparatuses that support reliable determination of retransmission or new packet in wireless protocols. Generally, the described techniques provide for receiving a first packet comprising a first sequence number (SEQN) and a second packet comprising a second SEQN, and obtaining a first hash for the first packet and a second hash for the second packet. The receiving device may classify the second packet as one of a new packet or a retransmission of the first packet based on a comparison between the first SEQN and the second SEQN and a comparison between the first hash and the second hash. The receiving device may selectively process the payload of the second packet based on the classifying.

A method of wireless communications at a receiving device is described. The method may include receiving a first packet including a first sequence number, and a second packet including a second sequence number, obtaining a first hash for the first packet and a second hash for the second packet, classifying the second packet as one of a new packet or a retransmission of the first packet based on a first comparison between the first sequence number and the second sequence number and a second comparison between the first hash and the second hash, and selectively processing a payload of the second packet based on the classifying.

An apparatus for wireless communications at a receiving device is described. The apparatus may include a processor, memory in electronic communication with the processor, and instructions stored in the memory. The instructions may be executable by the processor to cause the apparatus to receive a first packet including a first sequence number, and a second packet including a second sequence number, obtain a first hash for the first packet and a second hash for the second packet, classify the second packet as one of a new packet or a retransmission of the first packet based on a first comparison between the first sequence number and the second sequence number and a second comparison between the first hash and the second hash, and selectively process a payload of the second packet based on the classifying.

Another apparatus for wireless communications at a receiving device is described. The apparatus may include means for receiving a first packet including a first sequence number, and a second packet including a second sequence number, obtaining a first hash for the first packet and a second hash for the second packet, classifying the second packet as one of a new packet or a retransmission of the first packet based on a first comparison between the first sequence number and the second sequence number and a second comparison between the first hash and the second hash, and selectively processing a payload of the second packet based on the classifying.

A non-transitory computer-readable medium storing code for wireless communications at a receiving device is described. The code may include instructions executable by a processor to receive a first packet including a first sequence number, and a second packet including a second sequence number, obtain a first hash for the first packet and a second hash for the second packet, classify the second packet as one of a new packet or a retransmission of the first packet based on a first comparison between the first sequence number and the second sequence number and a second comparison between the first hash and the second hash, and selectively process a payload of the second packet based on the classifying.

In some examples of the method, apparatuses, and non-transitory computer-readable medium described herein, obtaining the first hash and the second hash may include operations, features, means, or instructions for receiving the first hash in the first packet and the second hash in the second packet, where the first and second hash may be based on at least one of a message integrity check (MIC) signal and a CRC signal.

In some examples of the method, apparatuses, and non-transitory computer-readable medium described herein, obtaining the first hash and the second hash may include operations, features, means, or instructions for receiving a first message integrity check (MIC) signal in the first packet and a second MIC signal in the second packet, and generating the first hash and the second hash based on the first MIC signal and the second MIC signal, respectively.

In some examples of the method, apparatuses, and non-transitory computer-readable medium described herein, obtaining the first hash and the second hash may include operations, features, means, or instructions for receiving a first CRC signal in the first packet and a second CRC signal in the second packet, and generating the first hash and the second hash based on the first CRC signal and the second CRC signal, respectively.

In some examples of the method, apparatuses, and non-transitory computer-readable medium described herein, classifying the second packet may include operations, features, means, or instructions for determining that the first sequence number and the second sequence number match, determining that the first hash and the second hash match, and classifying the second packet as a retransmission of the first packet based on the matching first sequence number and second sequence number and the matching first hash and second hash.

In some examples of the method, apparatuses, and non-transitory computer-readable medium described herein, classifying the second packet may include operations, features, means, or instructions for determining that the first sequence number and the second sequence number do not match, determining that the first hash and the second hash do not match, and classifying the second packet as a new packet based on the non-matching first sequence number and the second sequence number and the non-matching first hash and second hash.

In some examples of the method, apparatuses, and non-transitory computer-readable medium described herein, classifying the second packet may include operations, features, means, or instructions for determining that the first sequence number and the second sequence number match, determining that the first hash and the second hash do not match, and classifying the second packet as a new packet based on the non-matching first hash and second hash.

In some examples of the method, apparatuses, and non-transitory computer-readable medium described herein, classifying the second packet may include operations, features, means, or instructions for determining that the first sequence number and the second sequence number do not match, determining that the first hash and the second hash match, and classifying the second packet as a retransmission based on the matching first hash and second hash.

In some examples of the method, apparatuses, and non-transitory computer-readable medium described herein, the receiving device may be a primary device, and where selectively processing the second packet may include operations, features, means, or instructions for sending a NACK message to a source device, based on classifying the second packet as a retransmission.

In some examples of the method, apparatuses, and non-transitory computer-readable medium described herein, the receiving device may be a primary device, and where selectively processing the second packet may include operations, features, means, or instructions for sending an ACK message to a source device, based on classifying the second packet as a new packet.

In some examples of the method, apparatuses, and non-transitory computer-readable medium described herein, the receiving device may be a secondary device, and where selectively processing the second packet may include operations, features, means, or instructions for discarding the second packet based on classifying the second packet as a retransmission.

Some examples of the method, apparatuses, and non-transitory computer-readable medium described herein may further include operations, features, means, or instructions for determining, during a synchronization procedure, that the discarded second packet may be a new packet, and receiving, from a primary connected device, the second packet during a synchronization procedure.

In some examples of the method, apparatuses, and non-transitory computer-readable medium described herein, the receiving device may be a secondary device, and where selectively processing the second packet may include operations, features, means, or instructions for accepting the second packet based on classifying the second packet as a new packet.

Some examples of the method, apparatuses, and non-transitory computer-readable medium described herein may further include operations, features, means, or instructions for determining, during a synchronization procedure, that the accepted second packet may be a retransmission of the first packet, and discarding the second packet based on the determining.

DETAILED DESCRIPTION

Figure 1:
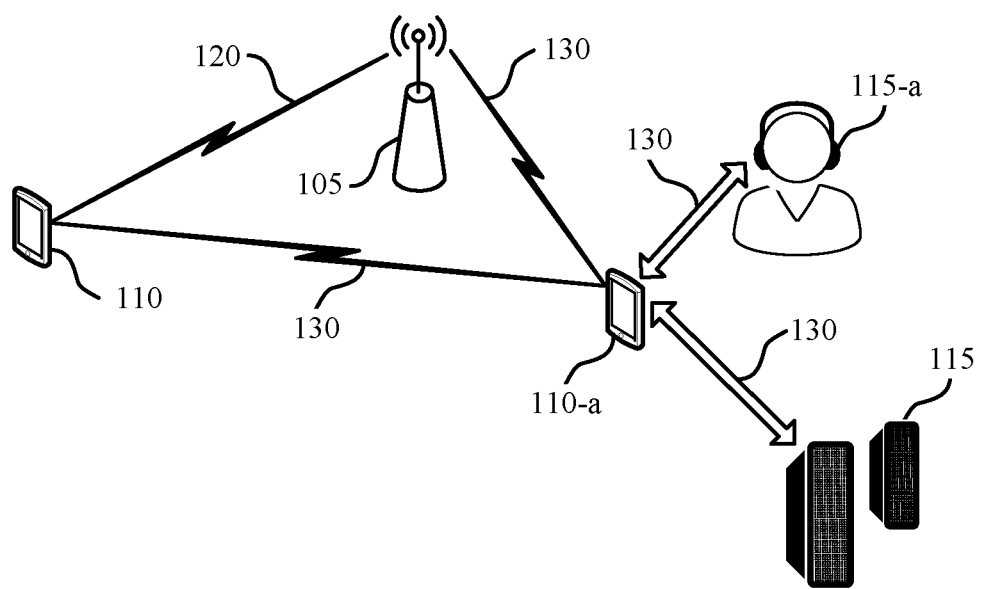
FIG. 1 illustrates an example of a system for wireless communications that supports reliable determination of retransmission or new packet in wireless protocols in accordance with aspects of the present disclosure.

In some examples of a wireless communications system, Bluetooth devices may include, for example, a source device such as a cell phone, smart phone, portable music player, or the like. Such a device may be in communication with one or more speakers (e.g., true wireless stereo (TWS) Bluetooth ear buds). A speaker, such as an ear bud (e.g., a primary ear bud), may be connected to the phone as a primary speaker, and may pass information (e.g., timing information) to the second ear bud (e.g., a secondary speaker or sniffer bud).

The secondary ear bud may sniff voice data between the primary ear bud and the phone.

In some examples of wireless communications protocols, a primary speaker and secondary speaker may determine whether a received packet is a retransmission of a previously received packet, or a new packet. Each packet may include a sequence number (SEQN) indicating where the received packet falls in a sequence of packets. If the receiving device makes this determination in error, then the user experience may be significantly degraded.

For example, a primary speaker may receive a packet, determine that it is a retransmission, send an acknowledgement (ACK) message to the source device, and may discard the payload of the received retransmission. However, in some cases, a SEQN for the packet may be corrupted (e.g., a SEQN number flip), which may result in an erroneous classification of the packet. If a new packet is erroneously classified as a retransmission, then the primary ear bud may discard the payload of the packet, resulting in packet loss. In some examples, a single packet loss may have cascading effects, resulting in multiple packet losses or link loss. In examples where file transfer profile (FTP) procedures are performed, loss of packets may become known to one or more devices after a transferred file checksum is failed. In some examples, a primary speaker may erroneously classify a retransmission of a packet as a new packet. In such examples, the primary speaker may save the packet twice, and may erroneously discard a subsequent packet (e.g., may classify a subsequent new packet as a retransmission of the twice-saved packet). Such misclassification may lead to glitches in audio applications or file transfer failure in FTP applications.

In some examples, a secondary speaker (e.g., a sniffer bud) may erroneously classify one or more packets. For example, a primary speaker may regularly synchronize data with the secondary speaker. During time periods that occur between synchronization procedures, the secondary speaker may not be in direct contact with the source device. In such examples, packet loss may lead to misalignment of packet counters or SEQNs. Additionally, if packet counters are associated with encryption mechanisms, then all consequent packets may be wrongly decrypted. In some examples, a secondary speaker may miss a packet. In such examples, when the secondary speaker receives a subsequent packet, it may erroneously classify the subsequent new packet as a retransmission of an old packet, which may have additional cascading errors in classifying and processing subsequent packets.

In some examples, a primary or secondary speaker may reliably determine whether a packet is a retransmission of an old packet or a new packet based on SEQNs and hashes. A receiving speaker may identify a SEQN of the packet, and compare it to the SEQN of a most recently received packet to determine whether the SEQNs match. Additionally, the receiving speaker may obtain a hash from the packet and compare the hash to a hash obtained from a most recently received packet to determine whether the hashes match. The hash may be received as part of each received packet, or the speaker may generate the hashes based on received packets (e.g., based on a cyclic redundancy check (CRC), message integrity check (MIC), or the like). The speaker may determine whether the packet is a retransmission or a new packet based on the comparisons of both the SEQNs and the hashes. For instance, if the SEQNs and the hashes match, then the speaker may reliably classify the packet as a retransmission. Or, if the SEQNs do not match and the hashes do not match, then the speaker may reliably classify the packet as a new packet. If SEQNs match due to SEQN flip, packet corruption, or (at a secondary speaker) a missed packet, then the receiving speaker may still determine whether a packet is new or a retransmission by comparing the hashes.

Aspects of the disclosure are initially described in the context of wireless communications systems. Aspects of the disclosure are further illustrated by and described with reference to timelines and process flows. Aspects of the disclosure are further illustrated by and described with reference to apparatus diagrams, system diagrams, and flowcharts that relate to reliable determination of retransmission or new packet in wireless protocols.

FIG. 1 illustrates a wireless communications system 100 (e.g., which may include to refer to or include a wireless personal area network (PAN), a wireless local area network (WLAN), a Wi-Fi network) configured in accordance with various aspects of the present disclosure. The wireless communications system 100 may include an AP 105, devices (e.g., source devices 110), and paired devices (e.g., speakers 115) implementing WLAN communications (e.g., Wi-Fi communications) and/or Bluetooth communications. For example, source devices 110 may include cell phones, mobile stations, personal digital assistant (PDAs), other handheld devices, netbooks, notebook computers, tablet computers, laptops, or some other suitable terminology. Paired devices (e.g., speakers 115) may include Bluetooth devices capable of pairing with other Bluetooth devices (e.g., such as source devices 110), which may include wireless headsets, speakers, ear pieces, headphones, display devices (e.g., TVs, computer monitors), microphones, meters, valves, etc.

Bluetooth communications may refer to a short-range communication protocol and may be used to connect and exchange information between source devices 110 and speakers 115 (e.g., between mobile phones, computers, digital cameras, wireless headsets, speakers, keyboards, mice or other input peripherals, and similar devices). Bluetooth systems (e.g., aspects of wireless communications system 100) may be organized using a master-slave relationship employing a time division duplex protocol having, for example, defined time slots of 625 mu secs, in which transmission alternates between the master device (e.g., a source device 110) and one or more slave devices (e.g., paired devices such as speakers 115). In some cases, a source device 110 may generally refer to a master device, and a speaker 115 may refer to a slave device in a PAN. As such, in some cases, a device may be referred to as either a source device 110 or a speaker 115 based on the Bluetooth role configuration of the device. That is, designation of a device as either a source device 110 or a speaker 115 may not necessarily indicate a distinction in device capability, but rather may refer to or indicate roles held by the device in the PAN. Generally, source device 110 may refer to a wireless communication device capable of wirelessly exchanging data signals with another device, and speaker 115 may refer to a device operating in a slave role, or to a short-range wireless device capable of exchanging data signals with the mobile device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., source device 110-a) implements an audio source device (SRC) role and another device (e.g., speaker 115-a) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth speakers) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data. The controller stack is generally implemented in a low cost silicon device containing the Bluetooth radio and a microprocessor. The controller stack may be responsible for setting up communication links 130 such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A communication link 130 established between two Bluetooth devices (e.g., between a source device 110-a and a speaker 115-a) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., speaker 115-a) are acknowledged, and may be retransmitted if not acknowledged during a retransmission window. In addition, audio may be streamed between the source device 110-a and speaker 115-a using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a source device 110 may support WLAN communications via AP 105, which may include communicating over communication links 130 (e.g., WLAN communication links). The AP 105 and the associated source devices 110 may represent a basic service set (BSS) or an extended service set (ESS). The various source devices 110 in the network may be able to communicate with one another through the AP 105. In some cases the AP 105 may be associated with a coverage area, which may represent a basic service area (BSA).

Source devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100, and devices may communicate with each other via communication links 130 (e.g., peer-to-peer communication links). AP 105 may be coupled to a network, such as the Internet, and may enable a source device 110 to communicate via the network (or communicate with other source devices 110 coupled to the AP 105). A source device 110 may communicate with a network device bi-directionally. For example, in a WLAN, a source device 110 may communicate with an associated AP 105 via downlink (e.g., the communication link from the AP 105 to the source device 110) and uplink (e.g., the communication link from the source device 110 to the AP 105).

In some examples, content, media, audio, etc. exchanged between a source device 110 and a speaker 115 may originate from a WLAN. For example, in some cases, source device 110-a may receive audio from an AP 105 (e.g., via WLAN communications), and the source device 110-a may then implement the described techniques to relay or pass the audio to the speaker 115-a (e.g., via Bluetooth communications). In some cases, certain types of Bluetooth communications (e.g., such as high quality or high definition (HD) Bluetooth) may require enhanced quality of service. For example, in some cases, delay-sensitive Bluetooth traffic may have higher priority than WLAN traffic.

Figure 2A:
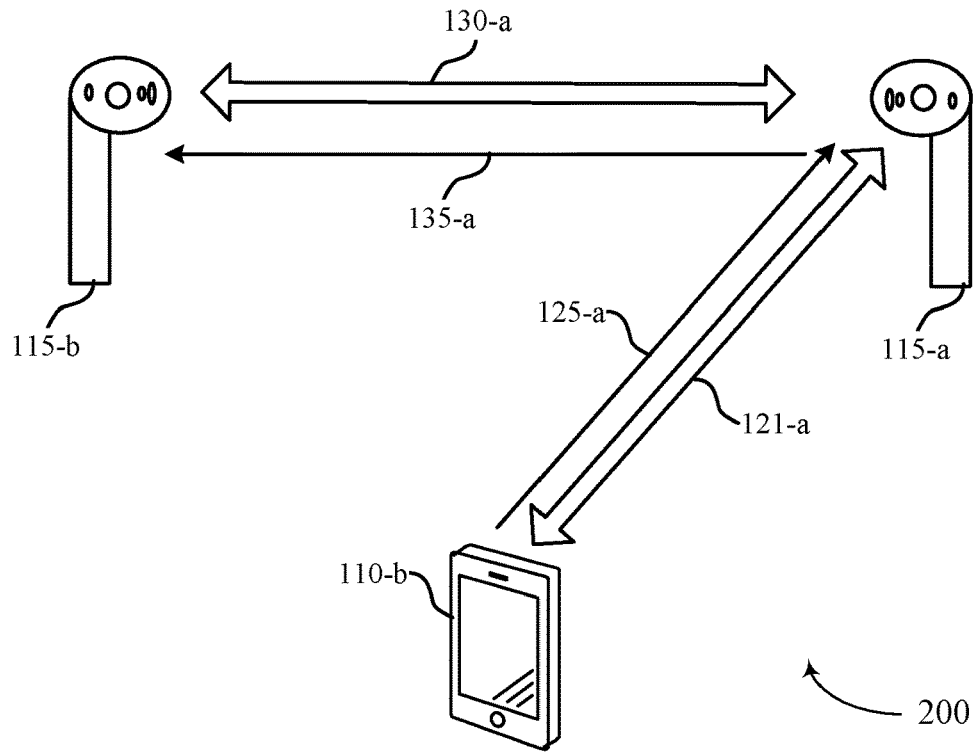
FIGS. 2A and 2B illustrates an example of a wireless communications system that supports reliable determination of retransmission or new packet in wireless protocols in accordance with aspects of the present disclosure.
Figure 2B:
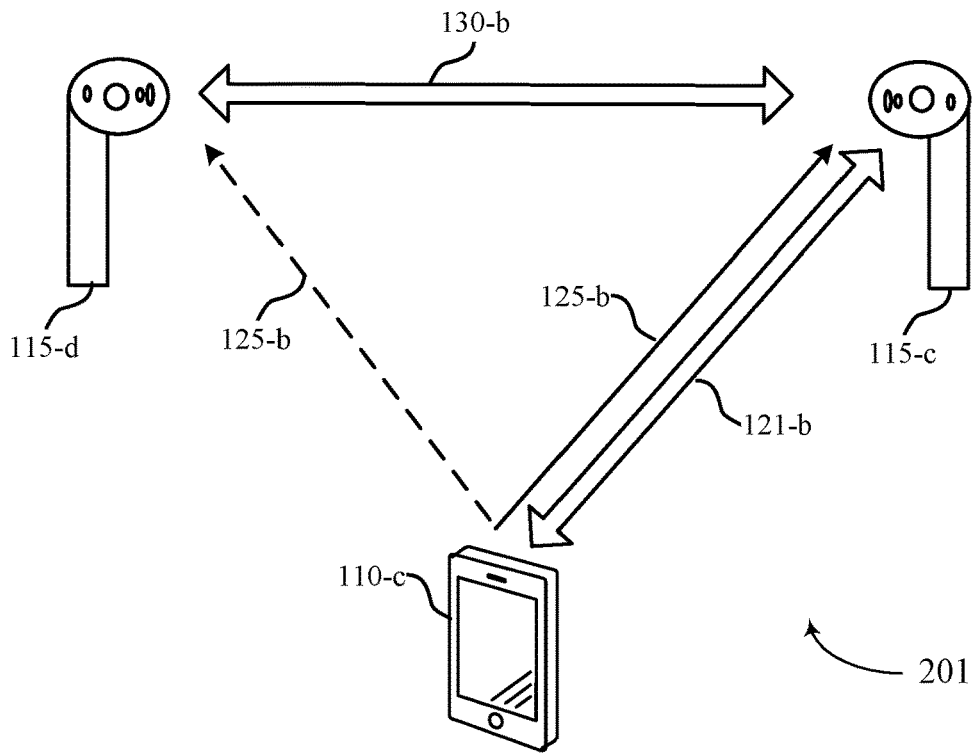

In some examples, as described in greater detail with respect to FIGS. 2A and 2B, a source device 110-*a* may be referred to as a source device 110-*a*, and a speaker 115-*a* may be referred to as a primary speaker or a secondary speaker. That is, a primary speaker 115-*a* may be in direct communication with a source device 110-*a*, and a second speaker 115-*a* may sniff communications between source device 110-*a* and primary speaker 115-*a*.

In some examples, a speaker 115-*a* may receive a first packet from source device 110-*a*, comprising a first sequence number (SEQN), and a second packet from source device 110-*a*, comprising a second SEQN. Speaker 115-*a* may obtain a first hash for the first packet and a second hash for the second packet, and may classify the second packet as one of a new packet or a retransmission of the first packet based on a comparison between the first SEQN and the second SEQN and a comparison between the first hash and the second hash. Speaker 115-*a* may selectively process the payload of the second packet based on the classifying.

A speaker 115 may receive a first packet including a first sequence number, and a second packet including a second sequence number, obtain a first hash for the first packet and a second hash for the second packet, classify the second packet as one of a new packet or a retransmission of the first packet based on a first comparison between the first sequence number and the second sequence number and a second comparison between the first hash and the second hash, and selectively process a payload of the second packet based on the classifying. An advantage of comparing the first and second sequence numbers and the first and second hashes, and classifying the packet based on the comparison, may be reliably ensuring that a current packet is one of a new packet or a retransmission of a previously received packet.

In some examples, the first and second hash may be based on at least one of a message integrity check MIC signal and a CRC signal. An advantage of obtaining a hash from an MIC or CRC may be reliably classifying the packet regardless of packet and encryption type.

FIG. 2A illustrates an example of a wireless communications system 200 with a first topology may include a wireless source device 110-*b*. Wireless source device 110-*b* may be, for example, a smart phone, a portable music playing device, or the like. Wireless source device 110-*b* may be in communication via bidirectional primary communication link 121-*a* with one or more speakers, such as first speaker 115-*a* or second speaker 115-*b*. Bidirectional primary communication link 121-*a* may include, for example, control information. In some examples, wireless source device 110-*b* may transmit voice data to first speaker 115-*a*. Wireless source device 110-*b* may transmit voice data 125-*a* over a separate voice link.

In some examples, first speaker 115-*a* may establish a communication link 130-*a* (e.g., a control link) with second speaker 115-*b*. First speaker 115-*a* may also transmit voice data 135-*a* to second speaker 115-*b* on a separate voice link.

In some examples, as shown in FIG. 2B, a wireless communications system 201 with a second topology may include a wireless source device 110-*c*, a first speaker 115-*c*, and a second speaker 115-*d*. In some examples, wireless source device 110-*c* may communicate with first speaker 115-*c* via a bidirectional primary communication link 121-*b*. Wireless source device 110-*c* may transmit voice data 125-*b* to first speaker 115-*c*. In some examples, first speaker 115-*c* may establish a communication link 130-*b* (e.g., a control link) with second speaker 115-*d*. First speaker 115-*c* and second speaker 115-*d* may communicate (e.g., perform synchronization procedures) via communication link 130-*b*.

In some examples, first speaker 115-*c* may provide second speaker 115-*d* with information, or may perform connection or synchronization procedures via communication link 130-*b*. Second speaker 115-*d* may perform Bluetooth sniffing procedures based on the information received via communication link 130-*b*, and may receive audio data (e.g., voice data 125-*b*) that is sent from wireless source device 110-*c* to first speaker 115-*c*.

In the first topology of FIG. 2A and the second topology of FIG. 2B, one or both of first speaker 115-*c* or second speaker 115-*d* may be subject to packet failures, and may fail to successfully receive voice or audio data (e.g., voice data 125-*a*, voice data 125-*b*, or voice data 135-*a*). In such examples, if a first speaker 115-*c* or second speaker 115-*d* relies solely on SEQNs to determine whether a received packet is new or a retransmission, then the speaker 115 may lose one or more packets, fail to successfully decrypt current or subsequent encrypted packets, or experience glitches or other failures. Instead, first speaker 115 and second speaker 115 may use SEQNs and hashes associated with currently and previously received packets to reliably ensure that a current packet is one of a new packet or a retransmission of a previously received packet, as described in more detail with respect to FIG. 3.

In some examples, of a wireless communications system 201, wireless source device 110-*a* may transmit packets to first speaker 115-*c* which may be sniffed by second speaker 115-*d*. The packets may have different formats and may correspond to different encryption procedures. For example, Bluetooth basic rate/enhanced data rate (BREDR) packet structures may contain one-bit SEQNs, which are not included in CRC calculations. BREDR packet structure may include unencrypted asynchronous connection-less (ACL) packets containing CRC values. BREDR E0 encrypted packets may contain CRC octets applied prior to encryption. BREDR advanced encryption standard with Ciph34er block chain message authentication code (AES-CCM) encrypted packets may contain CRC octets applied after encryption. BREDR AES-CCM encrypted packets may also include one or more MIC octets which may be appended to the payload data prior to encryption. In some examples, as described in greater detail with respect to FIGS. 3 and 4, a speaker 115 may reliable determine whether a packet is a new packet or a retransmission of an old packet by using CRC octets for unencrypted or AES CCM encrypted packets as received, or by using encrypted CRC octets for E0 encrypted packets after decryption, or by using AES-CCM encrypted packets using MIC octets prior to decryption (e.g., because MIC octets are encrypted and the protocol has a potential of wrong decryption due to wrong packet counters).

Figure 3:
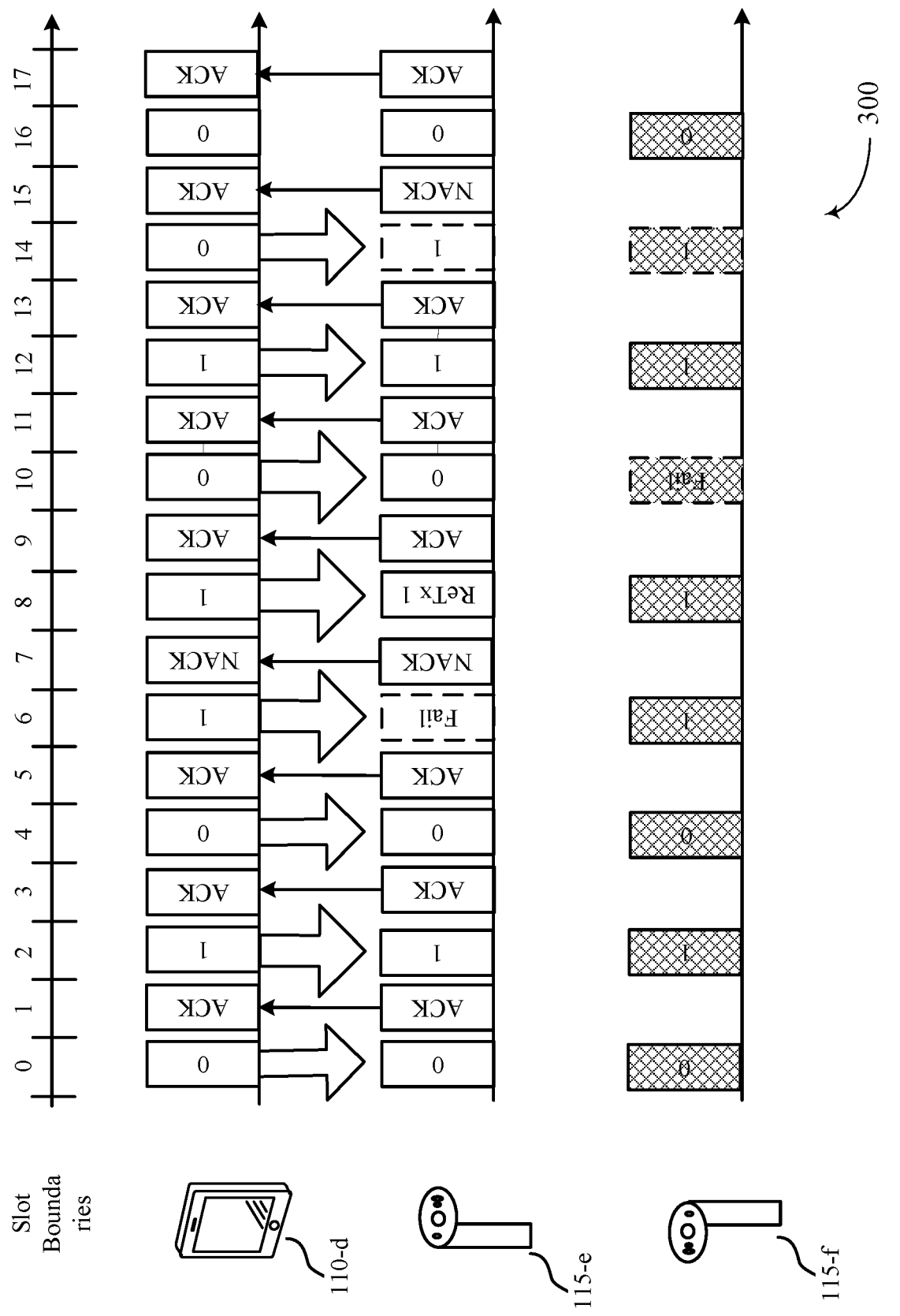
FIG. 3 illustrates an example of a timeline that supports reliable determination of retransmission or new packet in wireless protocols in accordance with aspects of the present disclosure.

FIG. 3 illustrates an example of a timeline 300 that supports reliable determination of retransmission or new packet in wireless protocols in accordance with aspects of the present disclosure. In some examples, timeline 300 may implement aspects of wireless communications system 100, wireless communications system 200, or wireless communications system 201. Timeline 300 may be implemented by a source device 110-*d*, a primary speaker 115-*e*, and a secondary speaker 115-*f*, which may be examples of corresponding devices described and illustrated with respect to FIGS. 1, 2A, and 2B.

In some examples, as described with respect to FIGS. 1, 2A, and 2B, a source device 110-*d* may be in direct communication with a primary speaker 115-*e* (e.g., a paired device 115, a primary ear bud, or the like). Secondary speaker 115-*f* (e.g., a sniffer ear bud) may not be in direct communication with the source device 110-*d*, and instead may sniff packets that are transmitted from source device 110-*d* to primary speaker 115-*e*. In some examples, some transmission time intervals (TTIs) (e.g., slots) may be reserved for transmissions from the source device 110-*d* (e.g., even slots) and some TTIs may be reserved for hybrid automatic repeat request (HARM) signaling from the primary speaker 115-*e* to the source device 110-*d*.

Each packet transmitted from source device 110-*d* may include a SEQN. Incremental SEQNs may indicate where a packet fits in a sequence of packets. In some examples, a total number of SEQNs may be finite, and upon reaching the highest SEQN, the SEQNs may repeat. In some examples, a SEQN field in a packet may be a one-bit field. In such examples, SEQNs may alternate between packets, such that alternating packets include matching SEQNs, but consecutive packets have different SEQNs. However, if a one-bit SEQN is corrupted (e.g., flipped) or even one bit of a multi-bit SEQN is corrupted (e.g., flipped), then a receiving speaker 115 may erroneously classify the received packet, if classifying is based solely on SEQN. Instead, as described in greater detail below, a speaker 115 may use both SEQN and hashes to classify a packet.

Using SEQNs and hashes to classify packets may include receiving hashes in packets, or generating hashes based on the contents of received packets. For example, a receiving speaker 115 may calculate one or more hashes upon reception of a packet. For unencrypted packets, the hash values may be calculated on the payload. For encrypted packets where encryption is locked based, the hash should be calculated on decrypted payloads (e.g., EO encryption). For encrypted packets where encryption is packet counter based, the speaker 115 may calculate the hash on the payload before decryption (e.g., AES-CCM encryption). In some examples, a speaker 115 may also use one or more MIC octets (e.g., before decryption) for identifying a retransmission or a new packet in a similar way or in combination with CRC octets. A speaker 115 may use one or all of CRC octets, MIC octets, a hash generated based on one or both of CRC octets and MIC octets, or a combination thereof to reliably determine whether a packet is a new packet or a retransmission of a packet.

In some examples of wireless protocols, encryption may be based on a packet counter, or packet sequence, and CRC or any other kind of hash octets may be appended to the packet after encryption. In alternative examples, CRC octets may also be encrypted. In such examples, a speaker 115 may use CRC octets prior to encryption to determine whether a hash for a first and second packet match. By matching CRC octets, for example, a receiving speaker 115 may differentiate two consecutive packets having the same contents (e.g., or any two packets if a packet counter is used or if two packets which are apart by a number less than a sequence window of the wireless protocol). For instance, BREDR AES-CCM encryption depends upon a packet counter. Where such protocols are utilized, CRC octets, MIC octets before decryption, or both, may be used by a speaker 115 to differentiate between two packets with the same contents.

In a non-limiting illustrative example, during a first slot (e.g., slot 0) source device 110-*d* may send a packet to primary speaker 115-*e*. The packet may have a SEQN 0. Secondary speaker 115-*e* may receive the packet, and may send an ACK message during a subsequent HARQ slot (e.g., slot 1). Secondary speaker 115-*f* may perform sniffing procedures, and may also receive the first packet during slot 0.

Having received an ACK message from primary speaker 115-*e* during slot 1, source device 110-*d* may send a new packet with SEQN 1 during slot 2. Primary speaker 115-*e* may receive the new packet and may send an ACK message during slot 3. Secondary speaker 115-*f* may sniff the new packet during slot 2.

Reliable determination of packet classification may be performed for each packet. Primary speaker 115-*e* may determine that SEQN 1 for the packet received during slot 2 is different than SEQN 0 for the packet received during slot 0. However, primary speaker 115-*e* may not be able to reliably determine that a SEQN flip has not occurred based solely on the SEQN, and that the SEQN for the packet received during slot 2 should not be 0 instead of 1. Instead of relying solely on the SEQNs, primary speaker 115-*e* may also obtain a hash for the packet received during slot 2, and compare it to a hash obtained from the packet received during slot 0. In some examples, comparing a first hash for a first packet and a second hash for a second hash may include comparing CRC octets from a first packet with CRC octets from a second packet, comparing MIC octets from a first packet with CRC octets from a second packet, or both MIC and CRC octets from a first packet with both MIC and CRC octets from the second packet. In some examples, comparing a first hash for a first packet and a second hash for a second packet may include generating a first hash from CRC octets, MIC octets, or both from a first packet and generating a second hash from CRC octets, MIC octets, or both from a second packet.

If the hashes do not match (and SEQN 1 does not match SEQN 0), then primary speaker 115-*e* may reliably classify the packet received during slot 2 as a new packet. Similarly, secondary speaker 115-*f* may compare the SEQNs and the hashes obtained from the packet received during slot 2 and the packet received during slot 0, and may reliably classify the packet received during slot 2 as a new packet (e.g., based on the fact that the SEQNs do not match and the hashes do not match). Details regarding obtaining the hashes based CRC, MIC, or the like, are described in greater detail with respect to FIG. 4.

Reliable determination of packet classification may be performed when a packet is not successfully received by a primary speaker 115-*e*. Primary speaker 115-*e* may receive a packet and classify it as new packets during slot 4, and may send an ACK message during slot 5. During slot 6, primary speaker 115-*e* may fail to receive a packet with a SEQN 1. Secondary speaker 115-*f* may successfully sniff the packet. Primary speaker 115-*e* may fail to send an ACK message, or may transmit a NACK message during slot 7, resulting in a retransmission of the missed packet during slot 8. Primary speaker 115-*e* may compare the SEQN 1 of the packet received during slot 8 and the SEQN 0 of the packet received during slot 4 (e.g., the most recent received packet), and determine that the SEQNs do not match. Primary speaker 115-*e* may also obtain and compare hashes for the two packets. Upon determining that the hashes do not match, primary speaker 115-*e* may classify the packet received during slot 8 has a new packet, and may process the payload of the packet accordingly. For example, instead of classifying the packet as a retransmission and discarding the payload, primary speaker 115-*e* may save the packet.

Secondary speaker 115-*f* may successfully receive the packet with SEQN 1 during slot 6. During slot 8, secondary speaker 115-*f* may also receive the retransmission of the same packet with SEQN 1. Secondary speaker 115-*f* may compare the SEQNs of the packets transmitted during slot 6 and slot 8, respectively, and determine that the SEQNs match. Secondary speaker **115-*f* may also compare hashes obtained from the two packets, respectively. Upon determining that the hashes and the SEQNs match, secondary speaker 115-*f* may reliably determine that the packet received during slot 8 is a retransmission of the packet transmitted during slot 6**, and may discard the payload of the retransmitted packet.

Reliable determination of packet classification may be performed when secondary speaker **115-*f* fails to successfully receive a packet. During slot 10, source device 110-*d* may send a packet with SEQN 1, and primary speaker 115-*e* may successfully receive and ACK (during slot 11) the successfully received packet. However, secondary speaker 115-*f* may fail to receive the packet during slot 10 (e.g., may miss the packet). Having received an ACK message during slot 11, source device 110-*d* may transmit a new packet during slot 11 having a SEQN 1. Secondary speaker 115-*f* may receive the packet during slot 12, and compare the SEQN 1 of the packet received during slot 12 to the SEQN 1 of the packet received during slot 8 (e.g., the most recently received packet at secondary speaker 115-*f*). The fact that the matching SEQNs match could be relied upon to erroneously classify the packet receive during slot 12 as a retransmission of the packet received during slot 8. However, to reliably classify the packet received during slot 12, the secondary speaker 115-*f* may also compare hashes obtained from the packets, respectively. Secondary speaker 115-*f* may determine that the hashes of the respective packets do not match. Based on this determination, secondary speaker 115-*f*** may determine that the packet is a new packet, and may save the payload.

Reliable determination of packet classification may be performed when a packet is corrupted. During slot 14, source device **110-*d* may send a packet with SEQN 0 to primary speaker 115-*e*. However, the packet may be corrupted (e.g., may experience a SEQN flip) and one or both of primary speaker 115-*e* and secondary speaker 115-*f* may receive or sniff the packet with a SEQN 1. Primary speaker 115-*e* may compare the received SEQN 1 with the most recently received packet from slot 12, and may determine that the SEQNs match. Upon comparing a hash from the packet received in slot 14 and a hash from the packet received in slot 12, primary speaker 115-*e* may determine that the hashes do not match. In such examples, primary speaker 115-*e* may determine that the packet is a new packet and not a retransmission of an old packet, and may save the payload of the packet received in slot 14 and send an ACK message in slot 15. Secondary speaker 115-*f* may similarly determine that the packet sniffed during slot 14 is a new packet. In some cases, primary speaker 115-*e* may ensure that the packet classification is correct by sending a NACK message during slot 15. In such examples, source device 110-*d* may send a retransmission of the packet during slot 16. Primary speaker 115-*e* may compare the SEQNs and the hashes, and may determine that the packet received during slot 16 is a retransmission of the packet received during slot 14. If primary speaker 115-*e* saved the packet received during slot 14, then primary speaker 115-*e* may discard the retransmission received during slot 16. Secondary speaker 115-*f* may similarly determine that the packet received during slot 16 is a retransmission, and may discard the packet received during slot 16**.

In some examples, primary speaker **115-*e* or secondary speaker 115-*f* may improperly classify a received packet. In such examples, during a subsequent synchronization procedure, errors may be corrected. For instance, if secondary speaker 115-*f* misclassifies a packet as a retransmission and discards the packet, then primary speaker 115-*e* may provide the packet to secondary speaker 115-*f*. If secondary speaker 115-*f*** misclassifies a retransmission as a new packet and thus has excess packets, then such excess packets may be discarded during synchronization.

Techniques described herein may provide for increased reliability of packet classification, and thus improved efficiency and user experience. Where a packet does not meet the criteria of a new packet or a retransmission, speakers 115 may avoid blindly discarding the packet or accepting the packet. For example, some devices may be configured to take protocol specific actions to save packet loss, detect packet loss, avoid repeated MIC errors, etc. Reliable detection of new packets or retransmissions of old packets may have multiple use cases. In some use cases, a device may detect ARQN flip or SEQN flip for unencrypted links, EO encrypted links, AES-CCM encrypted links in BREDR protocol or other similar wireless protocols. In some use cases, a device may align or realign a packet for a secondary speaker **115-*f*** with different hardware capabilities (e.g., decryption of the packet using one nonce corresponding to a next expected SEQN or based on a SEQN received using multiple nonces corresponding to the possible SEQNs).

Figure 4:
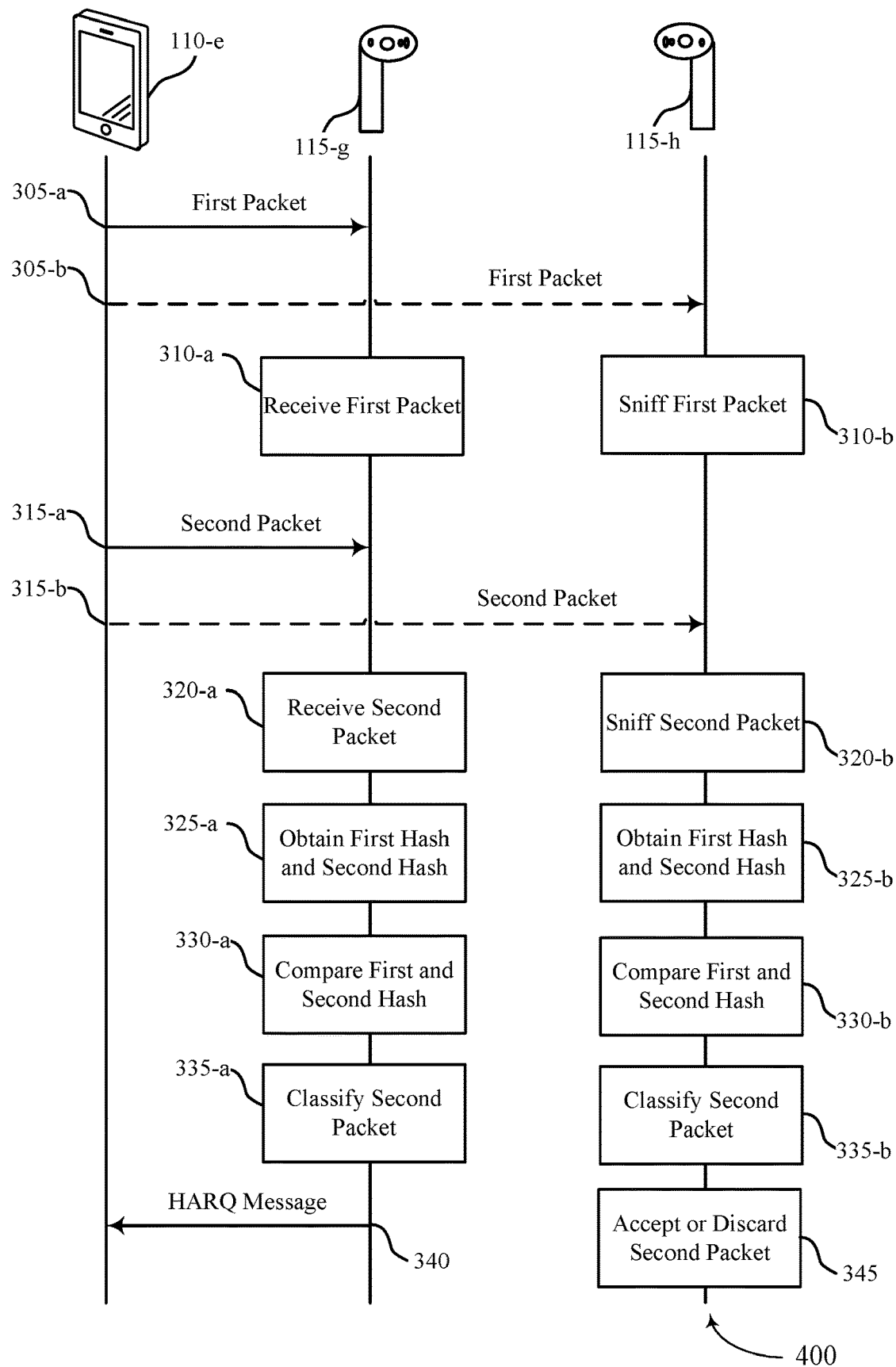
FIG. 4 illustrates an example of a process flow that supports reliable determination of retransmission or new packet in wireless protocols in accordance with aspects of the present disclosure.

FIG. 4 illustrates an example of a process flow 400 that supports reliable determination of retransmission or new packet in wireless protocols in accordance with aspects of the present disclosure. In some examples, process flow 400 may implement aspects of wireless communications system 100. Process flow 400 may be implemented by a source device **110-*d*, a primary speaker 115-*g*, and a secondary speaker 115-*h*, which may be examples of corresponding devices described and illustrated with respect to FIGS. 1, 2A, 2B, and 3**.

At **305-*a*, source device 110-*e* may transmit a first packet to connected primary speaker 115-*g* (e.g., a primary ear bud). Secondary speaker 115-*h* (e.g., a sniffer ear bud) may be capable of sniffing the first packet, as shown at 305-*b***.

At **310-*a*, primary speaker 115-*g* may receive the first packet. At 310-*b*, secondary speaker 115-*h* may sniff the first packet. Both primary speaker 115-*g* and secondary speaker 115-*h*** may identify a SEQN included in the first packet.

At **315-*a* source device 110-*e* may transmit a second packet to primary speaker 115-*g*. Secondary 115-*h* may be capable of sniffing the second packet, as shown at 315-*b***.

At **320-*a*, primary speaker 115-*g* may receive the second packet. At 320-*b*, secondary speaker 115-*g* may sniff the second packet. The second packet (and the first packet) may include a SEQN, and one or more CRC octets. In some examples, the SEQN may not be part of CRC calculations. In some examples, the second packet (and the first packet) may include a SEQN, one or more CRC octets, and one or more MIC octets. CRC fields or MIC fields may be used as received when they are not encrypted in the packet structure. If the fields are encrypted, then they may also be used as received (e.g., without decryption where encryption is not dependent on changing parameters such as clocks). If fields are encrypted and are dependent upon changing parameters, then a receiving speaker 115 may decrypt the fields, and then utilize them to generate a hash, compare hashes, etc., as described in greater detail at 325-*a* and 325-*b***.

At **325-*a*, primary speaker 115-*g*** may obtain a first hash for the first packet and a second hash for the second packet. In some examples, the hash may be received in the first packet and the second packet. In some examples, primary speaker 115-g may generate the hashes upon receiving the first and second packets.

In some examples, the first hash and the second hash may be based on CRC octets, MIC octets, or the like. For example, the first and second packets may include CRC octets. Primary speaker 115-g may generate a first hash for the CRC octets of the first packet, and a second hash for the CRC octets of the second packet. If the first and second packets include MIC octets, then the primary speaker 115-g may generate a hash for the MIC octets of the first packet and a second hash for the MIC octets of the second packet. In some examples, the first and second hashes may be based on both CRC octets and MIC octets.

Primary speaker 115-g may generate hashes based on MIC octets or CRC octets before or after encryption, depending on the type of packet. For example, for BREDR EO encrypted packets, then primary speaker 115-g may first decrypt the packet, and then generate the hash. For BREDR AES-CCM encrypted packets, primary 115-g may generate a hash based on CRC octets because the CRC octets may not be included in the encryption. In some cases, encryption and decryption may be erroneous because of a packet counter mismatch. In such examples, the hashes may be generated without encryption. For example, for BREDR AES-CCM encrypted packets, MIC octets may be used without decryption.

At 325-b, secondary speaker 115-h may obtain a first hash for the first packet and a second hash for the second packet. In some examples, the hash may be received in the first packet and the second packet. In some examples, secondary speaker 115-h may generate the hashes upon receiving the first and second packets. In some examples, the first hash and the second hash may be based on CRC octets, MIC octets, or the like. For example, the first and second packets may include CRC octets. Secondary speaker 115-h may generate a first hash for the CRC octets of the first packet, and a second hash for the CRC octets of the second packet. If the first and second packets include MIC octets, then the secondary speaker 115-h may generate a hash for the MIC octets of the first packet and a second hash for the MIC octets of the second packet. In some examples, the first and second hashes may be based on both CRC octets and MIC octets. Primary speaker 115-g may generate hashes based on MIC octets or CRC octets before or after encryption, depending on the type of packet.

At 330-a, primary speaker 115-g may compare the first hash and the second hash. Primary speaker 115-g may also compare the SEQN from the first packet and the SEQN from the second packet.

In some examples, comparing the hashes may include one or more of comparing CRC octets, MIC octets, and SEQNs. In some examples, primary speaker 115-g may receive the hashes in the first and second packet, respectively. In such examples, comparing the first and second hash may include comparing the CRC octets of the first packet to the CRC octets of the second packet, or comparing the MIC octets of the first packet to the MIC octets of the second packet. Or, comparing the first and second hash may include generating a hash from the CRC octets of the first and second packets and comparing the generated hashes, or generating a hash form the MIC octets of the first and second packets and comparing the generated hashes.

In some examples, comparing may include comparing hashes based on the CRC octets and MIC octets. For example, for protocols where MIC is calculated using a packet counter, MIC results may be used to determine whether the second packet is a new packet or a retransmission. Corrective action (e.g., selectively processing the payload of the second packet, sending a HARQ message from the primary speaker 115-h, etc.) may be taken based on the MIC result information. For instance, if SEQN do not match, and a hash based on a CRC does not match, and a MIC result is a pass, then primary speaker 115-g may reliably classify the second packet as a new packet. If the SEQN does not match, and the CRC based hashes do not match, but the MIC result is a fail, then primary speaker 115-g may reliably classify the second packet as a new packet (e.g., the second packet may include genuine MIC errors, and primary speaker 115-g may send a NACK message at 340). If the first and second SEQN match and the CRC-based hashes match, and the MIC result is a fail, then the second packet is reliably a retransmission. If the SEQNs match and the CRC-based hashes do not match, and the MIC result is a pass, then the second packet may be a new packet with a SEQN flip. Primary speaker 115-g may send a NACK message and receive the packet again, or may consider the packet a subsequent packet (e.g., new packet) and send an ACK message. If the SEQNs match and the CRC-based hashes do not match, and the MIC result is a fail, then the second packet may be a new packet with genuine MIC error with SEQN flip or a new packet received after a packet loss. Primary speaker 115-g may send a NACK message and resolve if the packet has a genuine MIC error. If not, then primary speaker 115-g may send a NACK message and increment the counter so that the second packet may be decrypted correctly when it is subsequently received. If the SEQNs do not match and the CRC-based hashes do match and the MIC result is a pass, then it is possible (e.g., a remote possibility) that the second packet is a new packet with the same content. If the SEQNs do not match and the CRC-based hashes do match and the MIC result is a fail, then the second packet may be a retransmission with a SEQN flip. Primary speaker 115-h may send a NACK message to resolve the question of whether the second packet is a new packet with the same content, and may receive the packet again.

At 330-b, secondary speaker 115-h may compare the first hash and the second hash. Secondary speaker 115-h may also compare the SEQN from the first packet and the SEQN from the second packet. Secondary speaker 115-h may perform comparisons of hashes as described in greater detail with respect to primary speaker 115-g at 330-a.

At 335-a primary speaker 115-g may classify the second packet as one of a new packet or a retransmission of the first packet sent at 305-a, based on the comparing at 330-a. For example, if the SEQNs of the first and second packet match, and the first and second hashes (e.g., generated hashes for CRC octets of the first and second packets, respectively) match, then primary speaker 115-g may reliably classify the second packet as a retransmission of the first packet. If the first and second SEQNs do not match, and the first and second hashes (e.g., generated hashes for CRC octets of the first and second packets, respectively) do not match, then primary speaker 115-g may reliably classify the second packet as a new packet.

In some examples, primary speaker 115-g may determine that the SEQN of the first packet and the SEQN of the second packet match, but the first hash and the second hash do not match. In such examples, primary speaker 115 may classify the first packet as a new packet. For instance the second packet may be a new packet with a corrupted SEQN. However, at 340, primary 115-g may send a NACK message to source device 110-e to ensure that it receives a retransmission of the second packet in case the classification is erroneous. The second packet with a SEQN that matches the SEQN of the first packet (but a hash that does not match the first hash) may be a new packet with a correct SEQN which comes subsequent to a SEQN that is lost. For example, packet loss may occur on a reliable link between source device 110-e and primary speaker where a NACK is converted to an ACK. The primary speaker 115-g may send a NACK message to source device 110-e to receive a retransmission of the second packet to ensure that no packets are lost. In some examples, to determine a SEQN flip or a ARQN flip, primary speaker 115-h may send a NACK message to source device 110-e a configurable number of times. In some examples, the number of times primary speaker 115-h sends the NACK message to determine an ARQN flip may be greater than the number of times primary speaker 115-h sends a NACK message to determine a SEQN flip. The configurable number of NACK messages may be known (e.g., preconfigured), or signaled via DCI signaling or RRC signaling. Packet loss may be signaled (e.g., via a NACK message) to applications.

In some examples, primary speaker 115-g may determine that the SEQN of the first packet and the SEQN of the second packet do not match, but the first hash and the second hash match. In such examples, primary speaker 115-g may classify the second packet as a retransmission. For example, primary speaker 115-g may successfully receive the first packet and send an ACK, but source device 110-e may experience ACK loss (bit flip such that the ACK message is received as a NACK message). In such examples, source device 110-e may send the second packet as a retransmission of the first packet. Primary speaker 115-e may accept the packet and classify it as a retransmission. Or, primary speaker 115-e may discard the payload of the packet, and send a NACK message at 340. After sending the NACK message, primary speaker 115-e may receive another retransmission of the packet, ensuring that the classification was not done in error. In some examples, the second device may be a new packet with the same content. In such examples, primary speaker 115-e may also send a NACK message to the source device 110-e. NACK messages may be sent to verify the classification of the second packet a configurable number of times. The configurable number of NACK messages may be higher to determine if a packet is a SEQN flip following an ACK loss than the configurable number of NACK message to determine whether the second packet is a new packet with the same content.

In some examples, the first and second packet may appear to have the same contents. In such examples where an encryption scheme used by a wireless protocol is packet counter based, CRC octets of the respective first and second packets, or MIC octets prior to decryption, may be different for packets having the same content. Thus, for some packets that are packet counter based (e.g., BREDR ACL links encrypted using AES-CCM) matching CRC octets or MIC octets may allow primary speaker 115-g to treat a second packet as a retransmission with a corrupted SEQN. Different configurations of devices may take different actions based on specific protocols.

At 335-b, secondary speaker 115-h may classify the second packet as one of a new packet or a retransmission of the first packet sent at 305-b, based on the comparing at 330-b based on the comparing at 330-b. For example, if the SEQNs of the first and second packet match, and the first and second hashes (e.g., generated hashes for CRC octets of the first and second packets, respectively) match, then secondary speaker 115-h may reliably classify the second packet as a retransmission of the first packet. If the first and second SEQNs do not match, and the first and second hashes (e.g., generated hashes for CRC octets of the first and second packets, respectively) do not match, then secondary speaker 115-h may reliably classify the second packet as a new packet.

In some examples, secondary speaker 115-h may determine that the SEQN of the first packet and the SEQN of the second packet match, but the first hash and the second hash do not match. In such examples, secondary speaker 115-h may classify the first packet as a new packet. For instance the second packet may be a new packet (e.g., with a corrupted SEQN). Secondary speaker 115-h may save the payload of the second packet. At 340, primary 115-g may send a NACK message to source device 110-e to ensure that it receives a retransmission of the second packet in case the classification is erroneous. Having already saved the second packet, secondary speaker 115-h may classify the retransmission of the second packet as a retransmission, and discard the payload. If one or more of the classifications is erroneous (e.g., the packet was not a new packet with a corrupted SEQN), then the excess packet may be addressed during a subsequent synchronization procedure. In some examples (e.g., the second packet is a new packet with a SEQN flip) the second packet may save the packet. In such examples, each set or sequence of packets may include a number of extra packets (e.g., two extra packets) in case of extra packets being saved. During a selective relay procedure, some implementations of the method may include discarding the extra packet or sending a saved packet to the primary speaker 115-g. In some examples, the second packet may be a new packet with a correct SEQN which comes subsequent to a SEQN that is lost. For example, packet loss may occur on a reliable link between source device 110-e and primary speaker 115-g where a NACK is converted to an ACK. In such examples, secondary speaker 115-h may save the payload of the second packet.

In some examples, secondary speaker 115-h may determine that the SEQN of the first packet and the SEQN of the second packet do not match, but the first hash and the second hash match. In such examples, secondary speaker 115-h may classify the second packet as a retransmission. For example, primary speaker 115-g may successfully receive the first packet and send an ACK, but source device 110-e may experience ACK loss (bit flip such that the ACK message is received as a NACK message). In such examples, source device 110-e may send the second packet as a retransmission of the first packet. Secondary speaker 115-h may classify the second packet as a retransmission, and discard the payload. In some examples, secondary speaker 115-h may classify the second packet as retransmission based on CRC octets or MIC octets prior to decryption, or both. This may allow secondary speaker 115-h to successfully determine the difference between a new packet, and a new packet with the same content that can be classified as a retransmission. Primary speaker 115-e may save the payload of the second packet or discard the payload of the packet, and may send a NACK message at 340. After sending the NACK message, primary speaker 115-e may receive a retransmission of the packet, ensuring that the classification was not done in error. If the classification was erroneous, then secondary speaker 115-h may receive a copy of the discarded second packet during a subsequent synchronization procedure. In some examples, the second device may be a new packet with the same content. In such examples, primary speaker 115-e may also send a NACK message to the source device 110-e. Secondary speaker 115-h may discard the payload of the second packet, but if the classification was erroneous and the payload of the second packet is needed at secondary speaker 115-*h*, then secondary speaker 115-*h* may receive a copy of the packet from primary speaker 115-*h* during a subsequent synchronization procedure. Or, secondary speaker 115-*h* may accept the second packet as a new packet (e.g., a new packet with the same content as the first packet). During a selective relay procedure, secondary speaker 115-*h* may determine that the second packet was a retransmission of the first packet, and may discard the packet.

In some examples, the first and second packet may appear to have the same contents. In such examples where an encryption scheme used by a wireless protocol is packet counter based, CRC octets of the respective first and second packets, or MIC octets prior to decryption, may be different for packets having the same content. Thus, for some packets that are packet counter based (e.g., BREDR ACL links encrypted using AES-CCM) matching CRC octets or MIC octets may allow primary speaker 115-*g* to treat a second packet as a retransmission with a corrupted SEQN. Different configurations of devices may take different actions based on specific protocols.

At 340, primary speaker 115-*g* may send a HARQ message to source device 110-*e*. The HARQ message may be an ACK message (e.g., upon classifying the second packet as a new packet and saving the second packet or upon classifying the second packet as a retransmission of the first packet and discarding the payload of the second packet) or a NACK message (e.g., upon classifying the second packet as a new packet to ensure that the classification is correct, or to verify a SEQN flip or ARQN flip, or the like).

At 345, secondary speaker 115-*h* may accept or discard (e.g., selectively process) the second packet, based on the classifying at 335-*b*.

Figure 5:
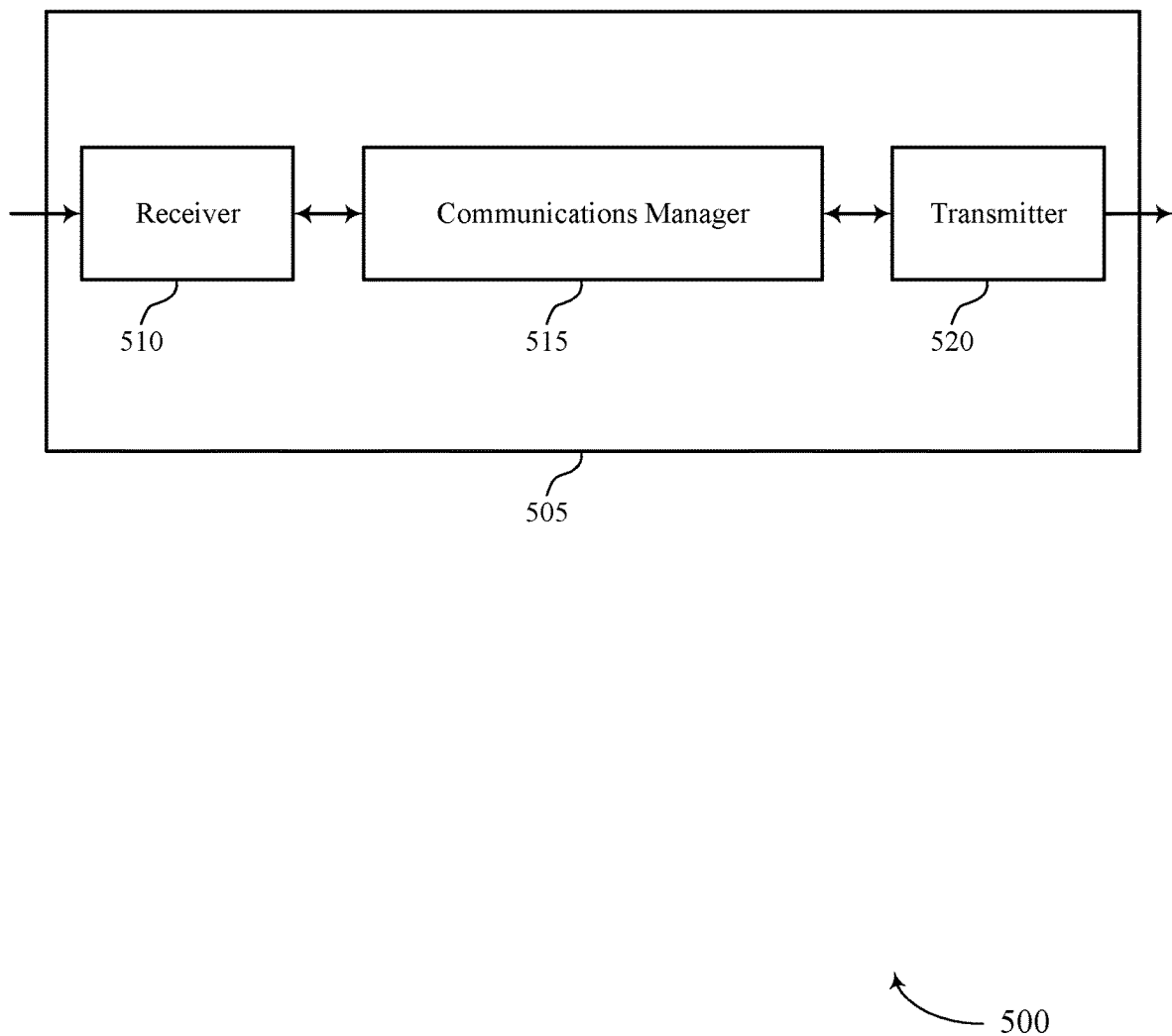
FIGS. 5 and 6 show block diagrams of devices that support reliable determination of retransmission or new packet in wireless protocols in accordance with aspects of the present disclosure.

FIG. 5 shows a block diagram 500 of a device 505 that supports reliable determination of retransmission or new packet in wireless protocols in accordance with aspects of the present disclosure. The device 505 may be an example of aspects of a speaker 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reliable determination of retransmission or new packet in wireless protocols, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a first packet including a first sequence number, and a second packet including a second sequence number, obtain a first hash for the first packet and a second hash for the second packet, classify the second packet as one of a new packet or a retransmission of the first packet based on a first comparison between the first sequence number and the second sequence number and a second comparison between the first hash and the second hash, and selectively process a payload of the second packet based on the classifying. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
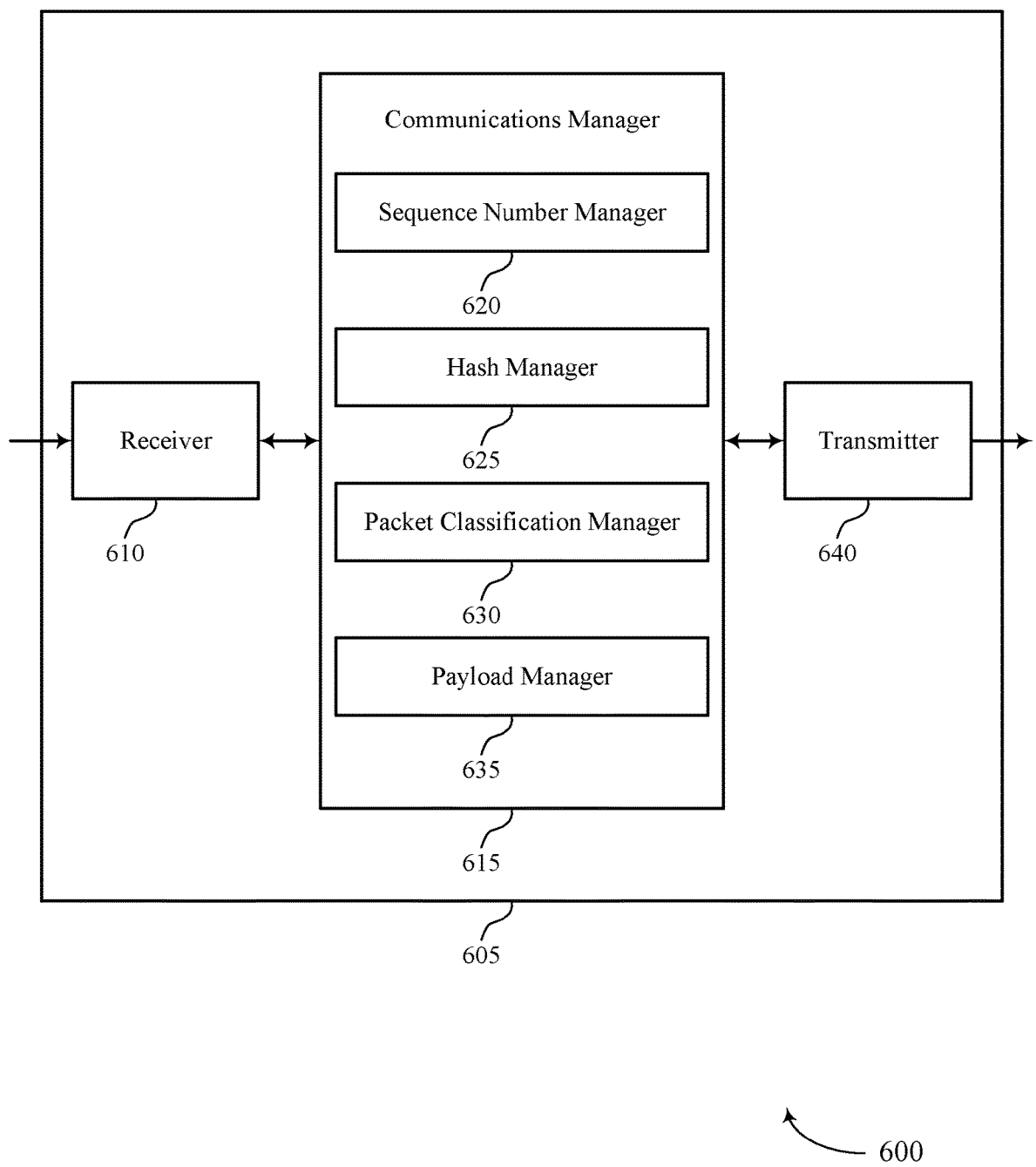

FIG. 6 shows a block diagram 600 of a device 605 that supports reliable determination of retransmission or new packet in wireless protocols in accordance with aspects of the present disclosure. The device 605 may be an example of aspects of a device 505, or a speaker 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to reliable determination of retransmission or new packet in wireless protocols, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a sequence number manager 620, a hash manager 625, a packet classification manager 630, and a payload manager 635. The communications manager 615 may be an example of aspects of the communications manager 810 described herein.

The sequence number manager 620 may receive a first packet including a first sequence number, and a second packet including a second sequence number.

The hash manager 625 may obtain a first hash for the first packet and a second hash for the second packet.

The packet classification manager 630 may classify the second packet as one of a new packet or a retransmission of the first packet based on a first comparison between the first sequence number and the second sequence number and a second comparison between the first hash and the second hash.

The payload manager 635 may selectively process a payload of the second packet based on the classifying.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
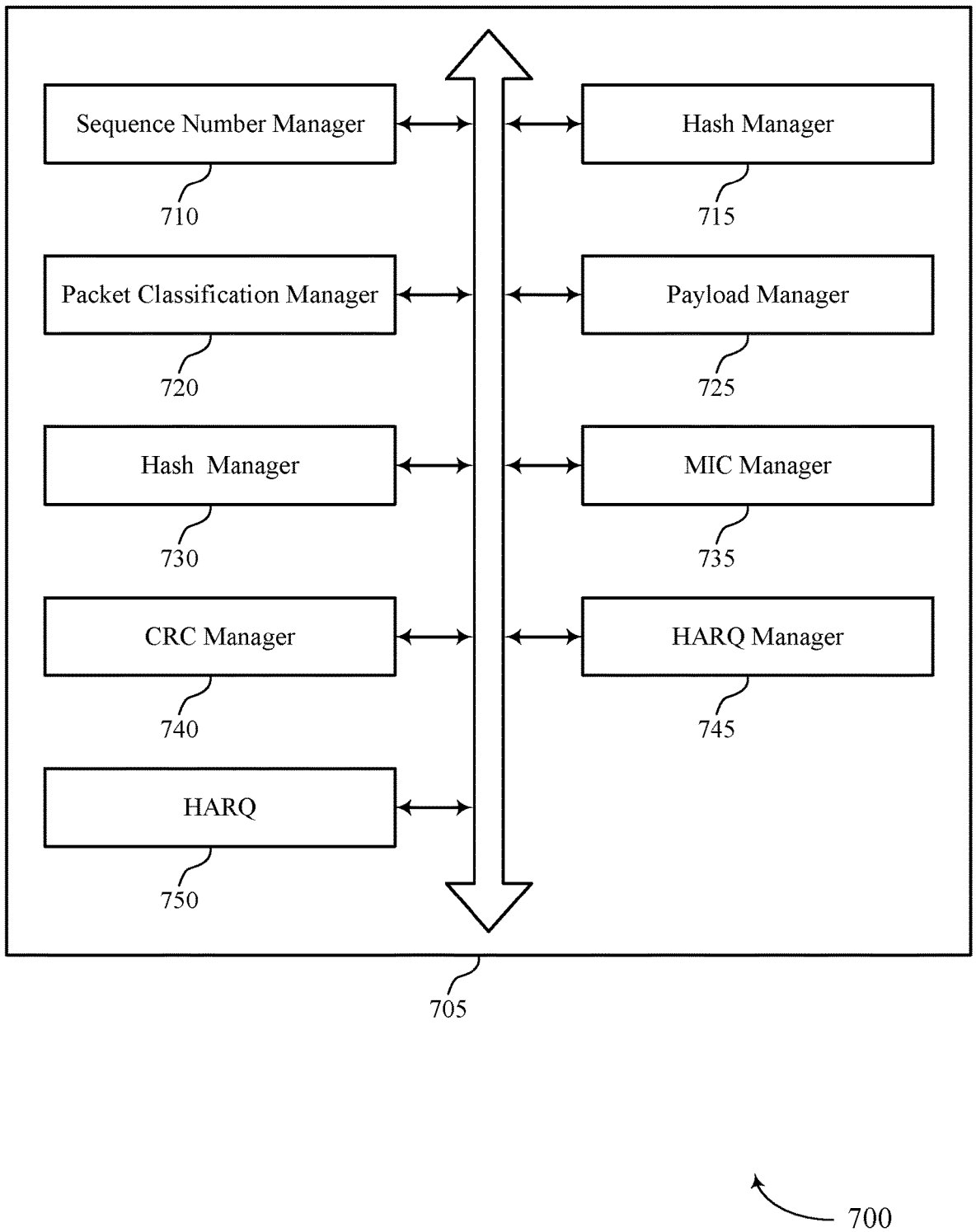
FIG. 7 shows a block diagram of a communications manager that supports reliable determination of retransmission or new packet in wireless protocols in accordance with aspects of the present disclosure.

FIG. 7 shows a block diagram 700 of a communications manager 705 that supports reliable determination of retransmission or new packet in wireless protocols in accordance with aspects of the present disclosure. The communications manager 705 may be an example of aspects of a communications manager 515, a communications manager 615, or a communications manager 810 described herein. The communications manager 705 may include a sequence number manager 710, a hash manager 715, a packet classification manager 720, a payload manager 725, a hash manager 730, a MIC manager 735, a CRC manager 740, a HARQ manager 745, and a HARQ 750. Each of these modules may communicate, directly or indirectly, with one another (e.g., via one or more buses).

The sequence number manager 710 may receive a first packet including a first sequence number, and a second packet including a second sequence number. In some examples, the sequence number manager 710 may determine that the first sequence number and the second sequence number match. In some examples, the sequence number manager 710 may determine that the first sequence number and the second sequence number do not match.

The hash manager 715 may obtain a first hash for the first packet and a second hash for the second packet. In some examples, the hash manager 715 may generate the first hash and the second hash based on the first MIC signal and the second MIC signal, respectively. In some examples, the hash manager 715 may generate the first hash and the second hash based on the first CRC signal and the second CRC signal, respectively. In some examples, the hash manager 715 may determine that the first hash and the second hash match. In some examples, the hash manager 715 may determine that the first hash and the second hash do not match.

The packet classification manager 720 may classify the second packet as one of a new packet or a retransmission of the first packet based on a first comparison between the first sequence number and the second sequence number and a second comparison between the first hash and the second hash. In some examples, the packet classification manager 720 may classify the second packet as a retransmission of the first packet based on the matching first sequence number and second sequence number and the matching first hash and second hash. In some examples, the packet classification manager 720 may classify the second packet as a new packet based on the non-matching first sequence number and the second sequence number and the non-matching first hash and second hash. In some examples, the packet classification manager 720 may classify the second packet as a new packet based on the non-matching first hash and second hash. In some examples, the packet classification manager 720 may classify the second packet as a retransmission based on the matching first hash and second hash.

The payload manager 725 may selectively process a payload of the second packet based on the classifying. In some examples, the payload manager 725 may discard the second packet based on classifying the second packet as a retransmission. In some examples, the payload manager 725 may determine, during a synchronization procedure, that the discarded second packet is a new packet. In some examples, the payload manager 725 may receive, from a primary connected device, the second packet during a synchronization procedure. In some examples, the payload manager 725 may accept the second packet based on classifying the second packet as a new packet. In some examples, the payload manager 725 may determine, during a synchronization procedure, that the accepted second packet is a retransmission of the first packet. In some examples, the payload manager 725 may discard the second packet based on the determining.

The hash manager 730 may receive the first hash in the first packet and the second hash in the second packet, where the first and second hash are based on at least one of a message integrity check (MIC) signal and a CRC signal.

The MIC manager 735 may receive a first message integrity check (MIC) signal in the first packet and a second MIC signal in the second packet.

The CRC manager 740 may receive a first CRC signal in the first packet and a second CRC signal in the second packet.

The HARQ manager 745 may send a NACK message to a source device, based on classifying the second packet as a retransmission.

The HARQ 750 may send an ACK message to a source device, based on classifying the second packet as a new packet.

Figure 8:
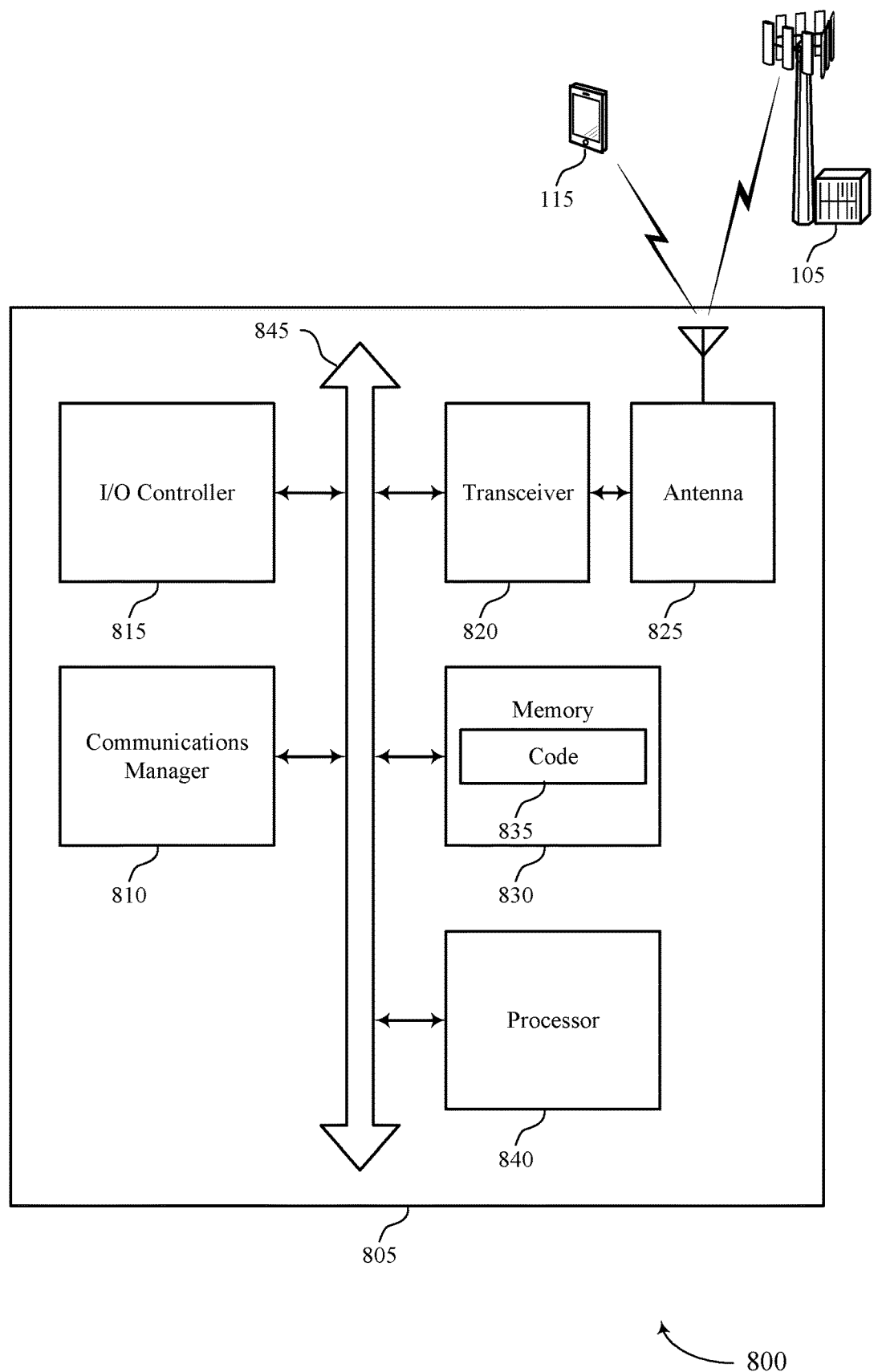
FIG. 8 shows a diagram of a system including a device that supports reliable determination of retransmission or new packet in wireless protocols in accordance with aspects of the present disclosure.

FIG. 8 shows a diagram of a system 800 including a device 805 that supports reliable determination of retransmission or new packet in wireless protocols in accordance with aspects of the present disclosure. The device 805 may be an example of or include the components of device 505, device 605, or a speaker 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a first packet including a first sequence number, and a second packet including a second sequence number, obtain a first hash for the first packet and a second hash for the second packet, classify the second packet as one of a new packet or a retransmission of the first packet based on a first comparison between the first sequence number and the second sequence number and a second comparison between the first hash and the second hash, and selectively process a payload of the second packet based on the classifying.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reliable determination of retransmission or new packet in wireless protocols).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
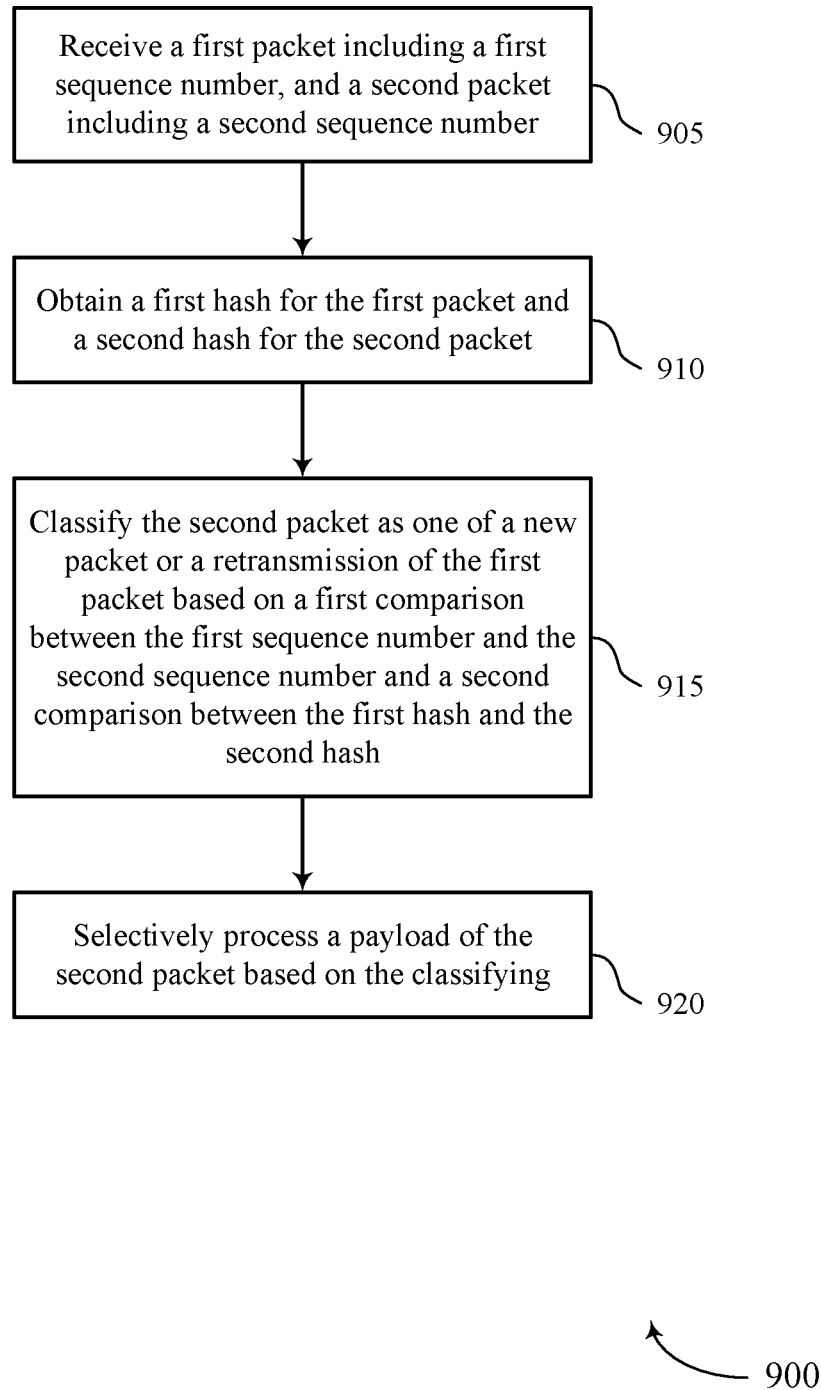
FIGS. 9 through 11 show flowcharts illustrating methods that support reliable determination of retransmission or new packet in wireless protocols in accordance with aspects of the present disclosure.

FIG. 9 shows a flowchart illustrating a method 900 that supports reliable determination of retransmission or new packet in wireless protocols in accordance with aspects of the present disclosure. The operations of method 900 may be implemented by a speaker 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive a first packet including a first sequence number, and a second packet including a second sequence number. The operations of 905 may be performed according to the methods described herein. In some examples, aspects of the operations of 905 may be performed by a sequence number manager as described with reference to FIGS. 5 through 8.

At 910, the UE may obtain a first hash for the first packet and a second hash for the second packet. The operations of 910 may be performed according to the methods described herein. In some examples, aspects of the operations of 910 may be performed by a hash manager as described with reference to FIGS. 5 through 8.

At 915, the UE may classify the second packet as one of a new packet or a retransmission of the first packet based on a first comparison between the first sequence number and the second sequence number and a second comparison between the first hash and the second hash. The operations of 915 may be performed according to the methods described herein. In some examples, aspects of the operations of 915 may be performed by a packet classification manager as described with reference to FIGS. 5 through 8.

At 920, the UE may selectively process a payload of the second packet based on the classifying. The operations of 920 may be performed according to the methods described herein. In some examples, aspects of the operations of 920 may be performed by a payload manager as described with reference to FIGS. 5 through 8.

Figure 10:
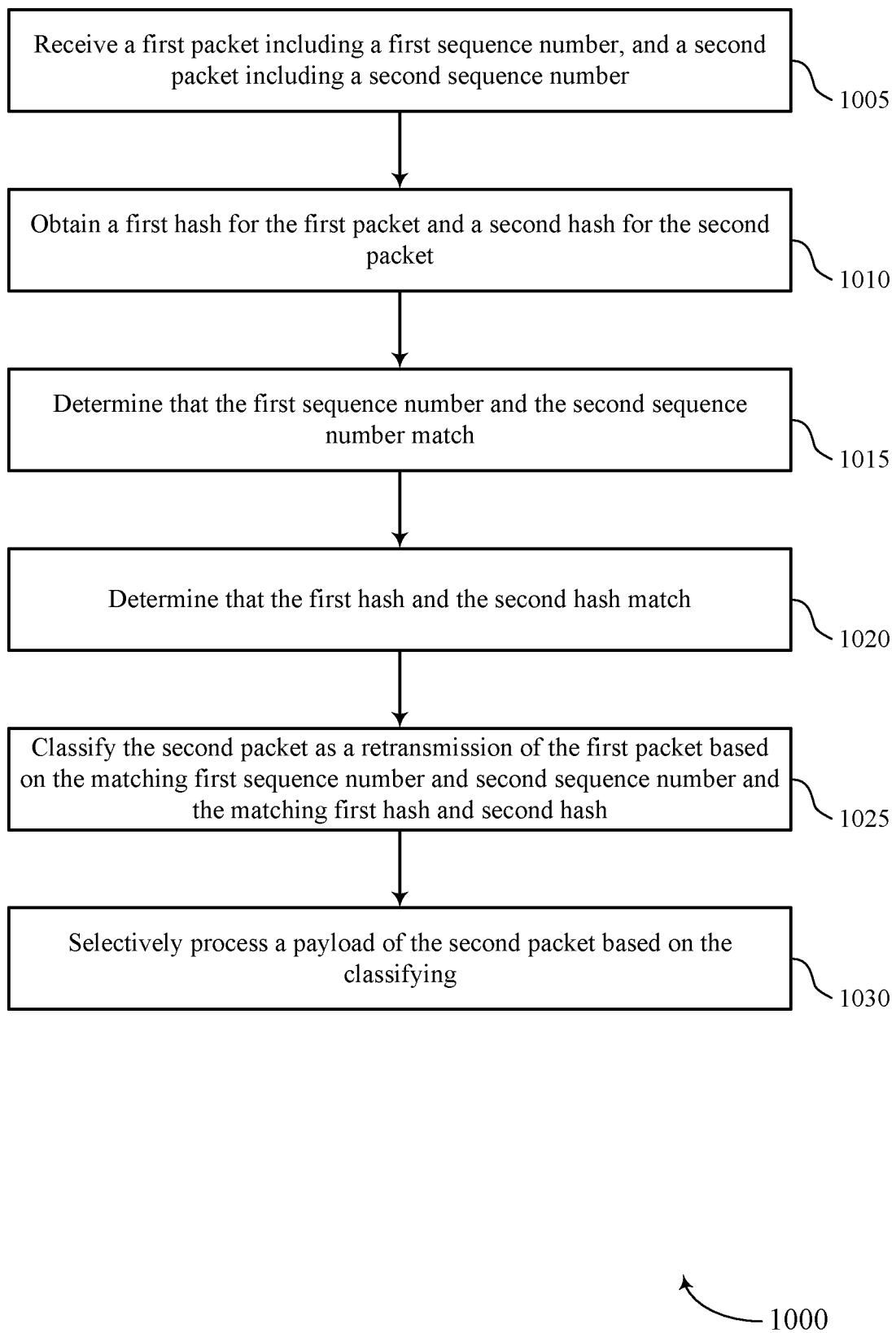

FIG. 10 shows a flowchart illustrating a method 1000 that supports reliable determination of retransmission or new packet in wireless protocols in accordance with aspects of the present disclosure. The operations of method 1000 may be implemented by a speaker 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive a first packet including a first sequence number, and a second packet including a second sequence number. The operations of 1005 may be performed according to the methods described herein. In some examples, aspects of the operations of 1005 may be performed by a sequence number manager as described with reference to FIGS. 5 through 8.

At 1010, the UE may obtain a first hash for the first packet and a second hash for the second packet. The operations of 1010 may be performed according to the methods described herein. In some examples, aspects of the operations of 1010 may be performed by a hash manager as described with reference to FIGS. 5 through 8.

At 1015, the UE may determine that the first sequence number and the second sequence number match. The operations of 1015 may be performed according to the methods described herein. In some examples, aspects of the operations of 1015 may be performed by a sequence number manager as described with reference to FIGS. 5 through 8.

At 1020, the UE may determine that the first hash and the second hash match. The operations of 1020 may be performed according to the methods described herein. In some examples, aspects of the operations of 1020 may be performed by a hash manager as described with reference to FIGS. 5 through 8.

At 1025, the UE may classify the second packet as a retransmission of the first packet based on the matching first sequence number and second sequence number and the matching first hash and second hash. The operations of 1025 may be performed according to the methods described herein. In some examples, aspects of the operations of 1025 may be performed by a packet classification manager as described with reference to FIGS. 5 through 8.

At 1030, the UE may selectively process a payload of the second packet based on the classifying. The operations of 1030 may be performed according to the methods described herein. In some examples, aspects of the operations of 1030 may be performed by a payload manager as described with reference to FIGS. 5 through 8.

Figure 11:
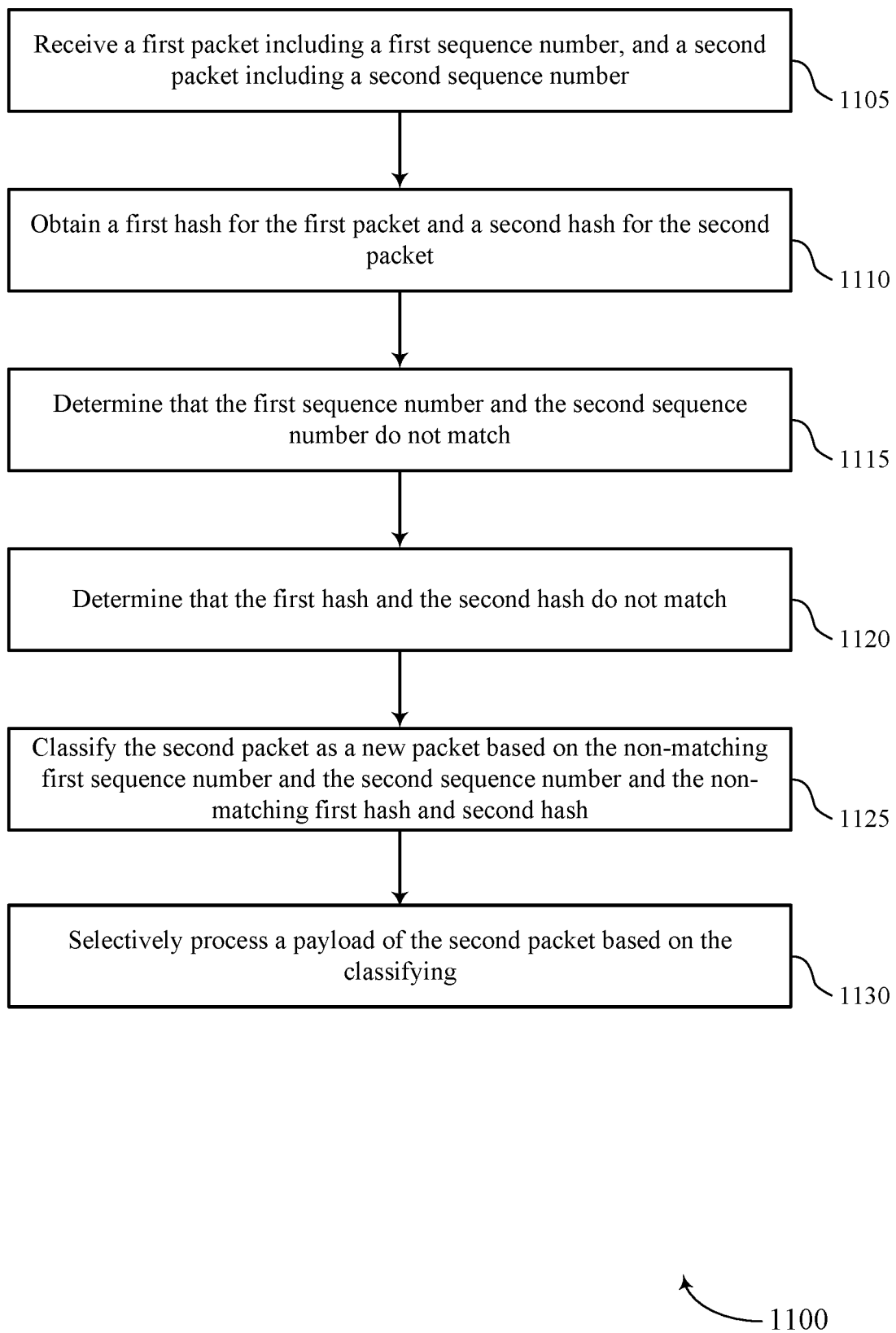

FIG. 11 shows a flowchart illustrating a method 1100 that supports reliable determination of retransmission or new packet in wireless protocols in accordance with aspects of the present disclosure. The operations of method 1100 may be implemented by a speaker 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive a first packet including a first sequence number, and a second packet including a second sequence number. The operations of 1105 may be performed according to the methods described herein. In some examples, aspects of the operations of 1105 may be performed by a sequence number manager as described with reference to FIGS. 5 through 8.

At 1110, the UE may obtain a first hash for the first packet and a second hash for the second packet. The operations of 1110 may be performed according to the methods described herein. In some examples, aspects of the operations of 1110 may be performed by a hash manager as described with reference to FIGS. 5 through 8.

At 1115, the UE may determine that the first sequence number and the second sequence number do not match. The operations of 1115 may be performed according to the methods described herein. In some examples, aspects of the operations of 1115 may be performed by a sequence number manager as described with reference to FIGS. 5 through 8.

At 1120, the UE may determine that the first hash and the second hash do not match. The operations of 1120 may be performed according to the methods described herein. In some examples, aspects of the operations of 1120 may be performed by a hash manager as described with reference to FIGS. 5 through 8.

At 1125, the UE may classify the second packet as a new packet based on the non-matching first sequence number and the second sequence number and the non-matching first hash and second hash. The operations of 1125 may be performed according to the methods described herein. In some examples, aspects of the operations of 1125 may be performed by a packet classification manager as described with reference to FIGS. 5 through 8.

At 1130, the UE may selectively process a payload of the second packet based on the classifying. The operations of 1130 may be performed according to the methods described herein. In some examples, aspects of the operations of 1130 may be performed by a payload manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a receiving device, comprising:
   receiving a first packet comprising a first sequence number, and a second packet comprising a second sequence number;
   obtaining a first hash for the first packet and a second hash for the second packet;
   classifying the second packet as one of a new packet or a retransmission of the first packet based at least in part on a first comparison between the first sequence number and the second sequence number and a second comparison between the first hash and the second hash; and
   selectively processing a payload of the second packet based at least in part on the classifying.

2. The method of claim 1, wherein obtaining the first hash and the second hash comprises:
   receiving the first hash in the first packet and the second hash in the second packet, wherein the first and second hash are based on at least one of a message integrity check (MIC) signal and a cyclic redundancy check (CRC) signal.

3. The method of claim 1, wherein obtaining the first hash and the second hash comprises:
   receiving a first message integrity check (MIC) signal in the first packet and a second MIC signal in the second packet; and
   generating the first hash and the second hash based at least in part on the first MIC signal and the second MIC signal, respectively.

4. The method of claim 1, wherein obtaining the first hash and the second hash comprises:
   receiving a first cyclic redundancy check (CRC) signal in the first packet and a second CRC signal in the second packet; and
   generating the first hash and the second hash based at least in part on the first CRC signal and the second CRC signal, respectively.

5. The method of claim 1, wherein classifying the second packet comprises:
   determining that the first sequence number and the second sequence number match;
   determining that the first hash and the second hash match; and
   classifying the second packet as a retransmission of the first packet based at least in part on the matching first sequence number and second sequence number and the matching first hash and second hash.

6. The method of claim 1, wherein classifying the second packet comprises:
   determining that the first sequence number and the second sequence number do not match;
   determining that the first hash and the second hash do not match; and
   classifying the second packet as a new packet based at least in part on the non-matching first sequence number and the second sequence number and the non-matching first hash and second hash.

7. The method of claim 1, wherein classifying the second packet comprises:
   determining that the first sequence number and the second sequence number match;
   determining that the first hash and the second hash do not match; and
   classifying the second packet as a new packet based at least in part on the non-matching first hash and second hash.

8. The method of claim 1, wherein classifying the second packet comprises:
   determining that the first sequence number and the second sequence number do not match;
   determining that the first hash and the second hash match; and
   classifying the second packet as a retransmission based at least in part on the matching first hash and second hash.

9. The method of claim 1, wherein the receiving device is a primary speaker, and wherein selectively processing the second packet comprises:
   sending a negative acknowledgement (NACK) message to a source device, based at least in part on classifying the second packet as a retransmission.

10. The method of claim 1, wherein the receiving device is a primary speaker, and wherein selectively processing the second packet comprises:

sending an acknowledgement (ACK) message to a source device, based at least in part on classifying the second packet as a new packet.

11. The method of claim 1, wherein the receiving device is a secondary speaker, and wherein selectively processing the second packet comprises:
   discarding the second packet based at least in part on classifying the second packet as a retransmission.

12. The method of claim 11, further comprising:
   determining, during a synchronization procedure, that the discarded second packet is a new packet; and
   receiving, from a primary connected device, the second packet during a synchronization procedure.

13. The method of claim 1, wherein the receiving device is a secondary speaker, and wherein selectively processing the second packet comprises:
   accepting the second packet based at least in part on classifying the second packet as a new packet.

14. The method of claim 13, further comprising:
   determining, during a synchronization procedure, that the accepted second packet is a retransmission of the first packet; and
   discarding the second packet based at least in part on the determining.

15. An apparatus for wireless communications at a receiving device, comprising:
   a processor,
   memory in electronic communication with the processor; and
   instructions stored in the memory and executable by the processor to cause the apparatus to:
      receive a first packet comprising a first sequence number, and a second packet comprising a second sequence number;
      obtain a first hash for the first packet and a second hash for the second packet;
      classify the second packet as one of a new packet or a retransmission of the first packet based at least in part on a first comparison between the first sequence number and the second sequence number and a second comparison between the first hash and the second hash; and
      selectively process a payload of the second packet based at least in part on the classifying.

16. The apparatus of claim 15, wherein the instructions to obtain the first hash and the second hash are executable by the processor to cause the apparatus to:
   receive the first hash in the first packet and the second hash in the second packet, wherein the first and second hash are based on at least one of a message integrity check (MIC) signal and a cyclic redundancy check (CRC) signal.

17. The apparatus of claim 15, wherein the instructions to obtain the first hash and the second hash are executable by the processor to cause the apparatus to:
   receive a first message integrity check (MIC) signal in the first packet and a second MIC signal in the second packet; and
   generate the first hash and the second hash based at least in part on the first MIC signal and the second MIC signal, respectively.

18. A non-transitory computer-readable medium storing code for wireless communications at a receiving device, the code comprising instructions executable by a processor to:
   receive a first packet comprising a first sequence number, and a second packet comprising a second sequence number;
   obtain a first hash for the first packet and a second hash for the second packet;
   classify the second packet as one of a new packet or a retransmission of the first packet based at least in part on a first comparison between the first sequence number and the second sequence number and a second comparison between the first hash and the second hash; and
   selectively process a payload of the second packet based at least in part on the classifying.

19. The non-transitory computer-readable medium of claim 18, wherein the instructions to obtain the first hash and the second hash are executable to:
   receive the first hash in the first packet and the second hash in the second packet, wherein the first and second hash are based on at least one of a message integrity check (MIC) signal and a cyclic redundancy check (CRC) signal.

20. The non-transitory computer-readable medium of claim 18, wherein the instructions to obtain the first hash and the second hash are executable to:
   receive a first message integrity check (MIC) signal in the first packet and a second MIC signal in the second packet; and
   generate the first hash and the second hash based at least in part on the first MIC signal and the second MIC signal, respectively.

* * * * *